May 8, 1962 W. H. SNOW 3,033,260
ANCHOR NUT ASSEMBLY WITH REMOVABLE SHIM
Filed Dec. 3, 1954
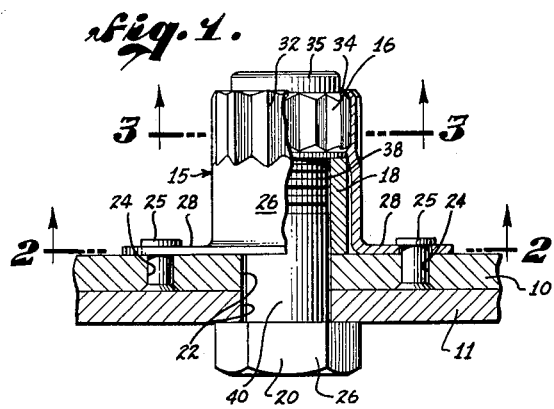
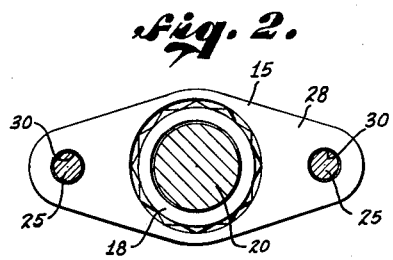
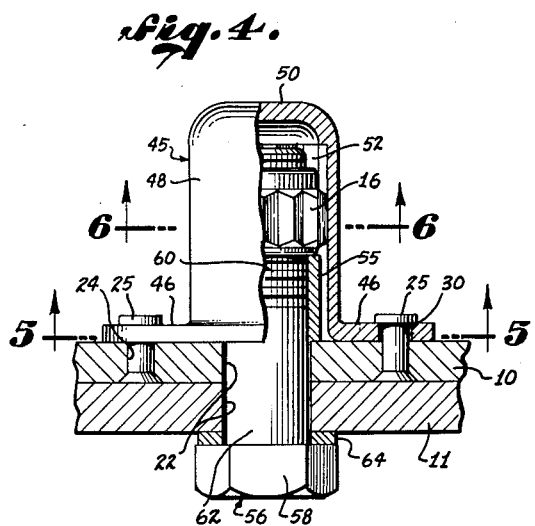
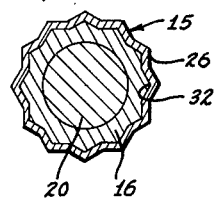
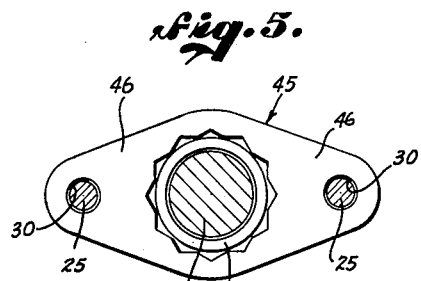
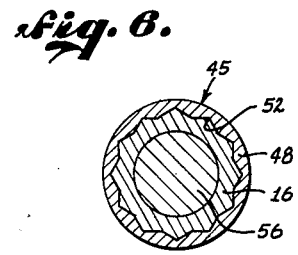
WILLIAM HERBERT SNOW,
INVENTOR.
BY *George J. Smyth*
ATTORNEY.

United States Patent Office 3,033,260
Patented May 8, 1962

1

3,033,260
ANCHOR NUT ASSEMBLY WITH
REMOVABLE SHIM
William Herbert Snow, 1413 E. Franklin Ave.,
El Segundo, Calif.
Filed Dec. 3, 1954, Ser. No. 472,957
3 Claims. (Cl. 151—41.7)

This invention relates to fastening devices of the general type known as anchor nuts for use in interconnecting pluralities of contiguous members such as plate or sheet members. The members to be interconnected are provided with aligned apertures to receive a suitable screw element which is threaded into a nut element and a shell or housing anchored to one of the contiguous members holds the nut against rotation.

The invention is directed to certain problems that arise when such fastening devices are used in successive instances to interconnect contiguous members with the aggregate thickness of the members varying among the instances.

The invention has special utility for use at spaced points along a multiple member structure of tapering total thickness, such as a structure that includes a tapering wing spar in an aircraft.

It is not practical to use a series of anchor nut assemblies in which the screw elements vary progressively in length in accord with the progressive change in total thickness of the members to be unified, because it would be necessary to provide a wide assortment of such screw elements for selective use and because the time required to match the screw lengths with the changing thicknesses at the various stages of the tapering structure would make the labor cost excessive.

A common solution to the problem has been to use identical anchor nut assemblies at all of the stations of the tapering structure in combination with flat shims. All of the screw elements are of the same length, a length adequate for the station of greatest structural thickness, and the flat shims are positioned under the anchor nut shells or housings at the stations of diminished structural thickness. The shims may be stamped from sheet metal and may have the same configuration in plan as the base of the anchor nut shell, the shims being apertured to clear the screw element as well as to receive rivets for anchoring the shell and shims in place. The craftsman uses as many shims as required to compensate for the diminishing thickness of the structure, stacks the shims together with the anchor nut shell, and then rivets the stack to one of the plurality of members that are to be unified by the device.

Since the conventional anchor nut shell used in this particular prior art practice is relatively shallow, with the nut element fixedly anchored therein, and since it is undesirable for the screw element to protrude noticeably beyond the shell, the compensation for diminishing thickness of the unified structure is necessarily confined solely to the use of the shims and shims are commonly required at all stations but the end station of maximum structural thickness. It is apparent that this prior art procedure is disadvantageous in requiring the craftsman to assemble the exact number of shims required at each station. A further objection is the resulting non-uniformity in the appearance of the anchor nut assembly, the varying stacks of shims giving the impression of improvisation instead of engineering and skilled craftsmanship.

The present invention meets this situation in four ways. In the first place, the invention provides an anchor nut shell of relatively long axial dimension to permit the screw element to be inserted into the shell to various degrees. In the second place, the invention contemplates the use of a screw element having a threaded leading portion of substantially greater axial dimension than the nut. In the third place, the invention provides liberal freedom for the nut element to slide longitudinally in the shell so that the nut may be positioned near either end of the shell. In the fourth place the invention contemplates the use of a tubular shim that may be housed entirely inside the shell.

One result of these various provisions is uniformity in appearance and the impression of good engineering since all of the anchor nut shells are anchored directly to the unified structure at each station with no visible intervening shims and since all of the anchor nut shells at the series of stations protrude from the unified structure by the same dimension. Another result is saving in labor since the craftsman does not have the burden of determining and assembling the exact number of shims required for thickness compensation at each station along the tapering structure.

With a screw element of the appropriate length for the station of maximum structural thickness, no tubular shim at all will be required for several of the next successive stations of relatively great structural thickness since compensation for the diminishing thickness of the unified structure is provided by corresponding increase in the degree to which each successive screw element extends through the nut into the corresponding anchor nut shell. Somewhere along the series of stations of progressive diminishing structural thickness, the compensating tubular shim is introduced into the anchor nut assembly, but there is latitude in this respect and usually the shim may be introduced at any one of as many as three or more of the stations. A further feature of the invention is that only one shim is required for several of the remaining stations of successively diminishing structure thickness and often only one shim is required to complete the whole series. The introduction of the shim into the anchor nut shell shifts the nut element towards the outer end of the shell to create a new range in latitude in the degree to which the screw extends through the nut.

At the stations where the multiple member structure that is to be unified is relatively thick, a substantial portion, if not a major portion, of the screw element is surrounded by and stabilized by the multiple member structure. On the other hand, at the stations where the multiple member structure to be unified is relatively thin in total thickness only a minor portion of the length of the screw element is stabilized by the multiple member structure. In this regard a feature of the invention is that the tubular shim may fit with sufficient snugness into the anchor nut shell to cooperate therewith for stabilizing the screw.

A further feature of the invention is that the tubular shims may be dimensioned for frictional fit into the interior of the anchor nut shells whereby tubular shims may be inserted into the shells in advance to remain therein during subsequent handling of the anchor nut assemblies. This feature makes it possible to eliminate any handling of shims whatsoever on the part of the craftsman. He has a supply of anchor nut assemblies without tubular shims and a second supply of anchor nut assemblies with shims frictionally mounted therein and merely reaches for one kind or the other in accord with the combined thickness of the structure that is to be unified.

The features and advantages of the invention may be understood from the following detailed description, considered with the accompanying drawing.

In the drawing, which is to be regarded as merely illustrative;

FIGURE 1 is a view partly in section and partly in side elevation showing one embodiment of the invention interconnecting two members;

FIGURE 2 is a transverse section taken as indicated by the line 2—2 of FIGURE 1;

FIGURE 3 is a transverse section taken as indicated by the line 3—3 of FIGURE 1;

FIGURE 4 is a view similar to FIGURE 1 showing a second embodiment of the invention;

FIGURE 5 is a transverse section taken as indicated by the line 5—5 of FIGURE 4; and FIGURE 6 is a transverse section taken as indicated by the line 6—6 of FIGURE 4.

FIGURES 1 to 3 show one embodiment of the invention for connecting one member 10 with another contiguous member 11 to provide a unified structure. The contiguous members 10 and 11 may be sheet or plate members or one member may be a tapering structural member such as a wing spar in an airplane.

The first embodiment of the invention, which may be aptly termed an anchor nut assembly, includes a housing or anchor nut shell 15, a nut element 16, a tubular shim 18 inside the shell, and a screw element in the form of a cap screw 20. The two members 10 and 11 have aligned apertures 22, respectively, through which the cap screw 20 extends and the upper member 10 has two countersunk bores 24 to receive suitable rivets 25 by means of which the shell 15 is anchored thereto.

The anchor nut shell 15 may be made of tubular stock and in this instance is made from relatively thin aluminum tubing stock that is cut and formed to provide an upright shell body 26 with an integral base flange providing two base ears 28. Each of the base ears 28 has an aperture 30 for engagement by one of the rivets 25. The upright body 26 of the anchor nut shell 15 is of non-circular internal configuration and preferably is formed with internal longitudinal grooves 32 of equal circumferential spacing. In this instance the upright body 26 of the shell is formed with twelve longitudinal grooves 32 for engagement either with a hexagonal nut element or with a twelve-point nut element. In the construction shown the nut element 16 is of a twelve-point configuration for engagement by each of the twelve longitudinal grooves 32. Preferably the outer end of the shell body 26 is slightly restricted to form an inner rim 34 as best shown in FIGURE 1 to serve as a stop for preventing the nut element 16 from passing through the outer end of the shell.

The twelve-point nut element 16 may be of any suitable construction. In this instance the nut element 16 is of the self-locking type and for this purpose has an outer end portion 35 in which is seated a suitable annular insert (not shown) of deformable plastic material for frictional engagement with threads of the cap screw 20 in a well known manner.

The tubular shim 18 is dimensioned to fit relatively closely around the cap screw 20, but in a freely slidable manner, and preferably also fits snugly into the interior of the body 26 of the anchor nut shell. This arrangement causes the tubular shim 18 to cooperate with the anchor nut shell to stabilize an extensive longitudinal portion of the cap screw 20 that lies within the interior of the shell body 26. The cap screw 20 is of a conventional type having a hexagonal head 26 at one end and a leading threaded portion 38 at the other end, the threaded portion being separated from the hexagonal head by an extensive smooth portion 40.

The manner in which this first embodiment of the invention serves its purpose may be readily understood from the foregoing description. To interconnect two members 10 and 11 of relatively small total thickness, the anchor nut shell 15 with the nut element 16 and the tubular shim 18 therein is riveted to the member 10 as shown. The cap screw 20 is then inserted through the apertures 22 of the two members 10 and 11 and the cap screw is threaded into the nut element 16 and tightened to bring the cap screw head 26 into pressure engagement with the exposed surface of the member 11.

The tightening of the cap screw in the nut element 16 draws the nut element into pressure engagement with the tubular shim 18 and causes the tubular shim to exert pressure in turn against the surface of the member 10. The full bearing surface of the lower face of the nut element 16 bears against the upper end of the tubular shim 18 and at least as large a bearing surface at the lower end of the tubular shim presses against the member 10. Thus the interposition of the tubular shim between the nut element 16 and the member 10 does not reduce the area of the surface of the anchor nut assembly that bears with pressure against the surface of the member 10.

In this first embodiment of the invention the combined length of the tubular shim 18 and the nut element 16 is nearly equal to the inner length of the anchor nut shell 15 so that the nut element is positioned at the outer end of the shell near the shell rim 34. It is to be understood, however, that the tubular shim 18 may be of less axial dimension than shown in FIGURE 1 to permit the nut element 16 to cooperate with the tubular shim at a position of the nut element further removed from the outer end of the shell.

It is apparent that the tubular shim 18 may be omitted entirely if the combined thickness of the two members 10 and 11 is greater than the axial dimension of the smooth portion 15 of the cap screw 20. With the tubular shim omitted the nut element 16 is positioned at the lower end of the shell 15 in direct contact with the member 10.

The second embodiment of the invention shown in FIGURES 4 to 6 is similar to the first embodiment of the invention and is anchored to the uppermost member 10 by rivets 25 as heretofore described. In this instance the anchor nut shell 45 is formed with the usual base ears 46 and upright body 48, but the outer end of the shell body is closed by an integral end wall 50. The upright body 48 has the usual twelve equally spaced longitudinal grooves 52 in its interior for engagement with the nut element 16. This closed construction permits the anchor nut shell 45 to confine a body of suitable highly viscous material (not shown) to serve as a seal.

A suitable tubular shim 55 is mounted inside the shell 45 and here again preferably the tubular shim is dimensioned for relatively close fit both with the surrounding shell and with the cap screw that threads into the nut element 16. The cap screw 56 shown in FIGURE 4 has the usual hexagonal head 58 and the usual threaded leading end portion 60, the threaded portion being separated from the hexagonal head by the usual smooth portion 62. If a viscous sealant material is confined inside the shell 45, a suitable sealing washer 64 may be interposed between the head 58 of the cap screw and the adjacent exposed surface of the lower member 11.

One fact to be noted in this second embodiment of the invention is that the upright body 48 of the anchor nut shell 45 is of liberal axial dimension to permit wide choice in the degree to which the cap screw 56 extends into the interior of the shell. A second fact to be noted is that the threaded portion 60 of the cap screw 56 is of substantially greater axial dimension than the nut element 16 to permit wide choice in the longitudinal positioning of the cap screw relative to the nut. A third fact to be considered is that the nut element 16 is of substantially less axial dimension than the shell body 48 and is slideable longitudinally throughout the length of the shell body to afford a wide range of choice in the longitudinal position of the nut element relative to the body. A fourth fact that is apparent in the arrangement shown in FIGURE 4 is that the tubular shim 55 is of only moderate length so that the total axial dimension of the tubular shim and the nut element 16 is substantially less than the length of the longitudinal grooves 15 inside the anchor nut shell 45.

The significance of these four facts is in the resulting flexibility in the use of the anchor nut assembly. Obviously the cap screw 56 may be threaded into the nut element 16 to various degrees in the arrangement shown in FIGURE 4 and there is room for the cap screw to extend into the anchor nut shell 45 to various degrees. Thus with the choice of including the shim 55 or not, the anchor nut assembly may be used to interconnect members such as members 10 and 11 that vary over a wide range of total thickness.

It can be seen in FIGURE 4 that only the smooth portion 62 of the cap screw 56 extends into the planes of the two members 10 and 11, the threaded end portion 60 of the cap screw being entirely within the configuration of the anchor nut shell 45. The smooth portion 62 of the cap screw cooperates effectively with the surrounding material of the members 10 and 11 to stabilize the cap screw. The cap screw is further stabilized by the pressure of the nut element against the tubular shim 55 and the consequent pressure of the tubular shim against the surface of the member 11. The cap screw is still further stabilized by the fact that the tubular shim 55 fits around the cap screw and also fits snugly in the anchored shell 45.

When the total or combined thickness of the two members 10 and 11 exceeds the length of the smooth portion 62 of the cap screw 56 the tubular shim 55 may be omitted to permit the nut element 16 to bear directly against the exposed surface of the member 10. Here again the liberal axial dimension of the shell body 48 together with the liberal axial dimension of the threaded portion of the cap screw relative to the axial dimension of the nut element 16 permits a wide range of variation in the degree to which the cap screw extends into the shell.

Thus the anchor nut assembly shown in FIGURE 4 with the tubular shim 55 included may be used to interconnect or unify members 10 and 11 throughout a liberal range of total thickness of the two members and, with the tubular shim omitted, the anchor nut assembly may be used to interconnect such two members throughout a second liberal range of greater total thickness of the two members. The relative dimensions of the elements of the anchor nut assembly may be such that these two ranges meet and even overlap so that the provision of a single tubular shim makes it possible to cover an exceptionally wide continuous range of total thicknesses of the two members. By providing two shims of different axial dimension, three ranges may be provided and these three ranges may overlap to provide one continuous range of total thickness on the part of the members 10 and 11, throughout which range the anchor nut assembly may be used effectively.

Although the now preferred embodiment of the present invention has been shown and described herein, it is to be understood that the invention is not to be limited thereto, for it is susceptible to changes in form and detail within the scope of the appended claims.

I claim:

1. A fastener assembly for use with a screw having a smooth shank portion to unite one member with another member, comprising: an outer shell of relatively large axial dimension to permit said screw to be inserted therein to various degrees, said shell being of non-circular inner configuration and having a base for anchorage to said one member; a nut for threaded engagement with said screw, said nut being mounted in said shell and being of cooperative non-circular configuration for engagement with said shell to be held thereby against rotation; and a tubular shim in said shell between said nut element and the base of the shell for compression between the nut and said one member, said nut being internally dimensioned to admit said screw and being slidable axially in said shell between a position toward the outer end of the shell for cooperation with said tubular shim and a position at the inner end of the shell for contact with said one member in the absence of the shim, whereby the fastener may be used to interconnect members of relatively small total thickness with the tubular shim concealed in the shell and may be used to interconnect members of larger total thickness with the tubular shim omitted, said tubular shim being dimensioned to fit frictionally in said shell thereby to yieldingly retain the nut element in said shell prior to anchorage of the shell to said one member and prior to engagement of the screw with the nut element.

2. A fastener assembly of the character described for connecting one apertured member to another apertured member through their apertures, comprising: a shell of non-circular inner configuration and having base flanges for anchorage to said one member; a nut mounted in said shell, said nut being of cooperative non-circular configuration for engagement with the shell to be held thereby against rotation; a screw having a smooth shank portion and a threaded shank portion at one end for engagement with said nut element, said screw having a head at the other end to exert pressure against the surface of said other member; and a tubular shim inside said shell for compression between the nut element and said one member, the combined axial dimension of said nut element and tubular shim being substantially less than the axial dimension of said shell and the axial dimension of said nut element being substantially less than the axial dimension of said threaded end portion of the screw whereby the nut element and the tubular shim may cooperate with said screw to interconnect the two members throughout a substantial range of variation in total thickness of the two members, said nut being slidable axially in said shell between a position toward the outer end of the shell for cooperation with said tubular shim and a second position at the inner end of the shell for contact with said one member in the absence of the tubular shim, whereby the fastener assembly may be used with the tubular shim concealed in the shell to interconnect said two members throughout a range of relatively small total thickness of the two members and whereby said shim may be omitted to permit the nut element alone to cooperate with said screw to interconnect the two members through a second substantial range of greater total thickness of the two members, said tubular shim being dimensioned to fit frictionally into said shell thereby to yieldingly retain the nut element in the shell prior to anchorage of the shell to said one member.

3. A fastener assembly for connecting one apertured member to another apertured member through their apertures, comprising: a shell of non-circular inner configuration adapted for anchorage to said one apertured member; a nut of non-circular outer configuration mounted in said shell to be held thereby against rotation; a screw having a smooth shank portion and a threaded end shank portion for engagement with said nut element, said screw having a head at the other end to exert pressure against the surface of said other member; and a tubular shim surrounding said nut element inside said shell for compression between the nut element and said one member, the combined axial dimension of said nut element and said tubular shim being substantially less than the axial dimension of said shell, and the axial dimension of said nut element being substantially less than the axial dimension of said threaded end portion of the screw, whereby the nut element and the tubular shim may cooperate with said screw to interconnect two apertured members throughout a substantial range of variation in total thickness of the two members and with said threaded portion of the screw element completely within the configuration of said shell, and whereby said tubular shim may be omitted to permit the nut element alone to cooperate with said screw to interconnect two members throughout a second substantial range of greater total thickness of the two members, said tubular shim being dimensioned to fit snugly around the screw and snugly inside said shell whereby the shell, when anchored to said one member, cooperates with said tubular shim to stabilize the screw, said tubular shim fitting frictionally into said shell to serve as means for yieldingly retaining said nut element in the shell when the fastener assembly is being handled prior to application to said two members.

References Cited in the file of this patent

UNITED STATES PATENTS

| | | |
|---|---|---|
| 473,272 | Trench | Apr. 19, 1892 |
| 994,892 | Tschudy | June 13, 1911 |
| 1,215,530 | Hightower | Feb. 13, 1917 |
| 1,464,216 | Paden | Aug. 7, 1923 |
| 1,843,985 | Nelson | Feb. 9, 1932 |
| 2,385,893 | Taylor | Oct. 2, 1945 |
| 2,396,005 | Gross | Mar. 5, 1946 |
| 2,572,401 | Snow | Oct. 23, 1951 |
| 2,635,666 | Murphy | Apr. 21, 1953 |

FOREIGN PATENTS

| | | |
|---|---|---|
| 661,221 | Great Britain | Nov. 21, 1951 |